United States Patent [19]

Milavec

[11] Patent Number: 5,295,914
[45] Date of Patent: Mar. 22, 1994

[54] THERMOPLASTIC ELASTOMER SEAL BOOT

[75] Inventor: Robin Z. Milavec, Saginaw, Mich.

[73] Assignee: General Motors Corporation, Detroit, Mich.

[21] Appl. No.: 953,370

[22] Filed: Sep. 30, 1992

[51] Int. Cl.$^5$ ................................................. F16D 3/84
[52] U.S. Cl. .................................... 464/175; 464/905; 277/212 FB
[58] Field of Search ............... 464/173, 175, 904, 905, 464/906; 277/212 FB; 403/57, 58, 50, 51

[56] References Cited

U.S. PATENT DOCUMENTS

| | | | |
|---|---|---|---|
| 2,432,803 | 12/1947 | Rice | 464/175 X |
| 3,688,523 | 9/1972 | Schafer | 464/175 |
| 3,830,083 | 8/1974 | Hadick et al. | 277/212 FB |
| 4,360,209 | 11/1982 | Ukai et al. | 277/212 FB X |
| 4,516,959 | 5/1985 | Keude | 277/212 FB X |
| 4,556,399 | 12/1985 | Billet et al. | 464/175 |
| 4,592,736 | 6/1989 | Mangiavacchi | 464/905 X |
| 4,642,067 | 2/1987 | Geisthoff et al. | 464/175 |
| 4,735,596 | 4/1988 | Ukai et al. | 464/175 |
| 4,844,486 | 7/1989 | Schiemann | 277/122 |
| 4,878,389 | 11/1989 | Boge | 464/175 X |
| 4,895,550 | 1/1990 | Baker | 464/175 |
| 4,927,678 | 5/1990 | Lallement | 464/175 X |
| 4,957,469 | 9/1990 | Zollinger | 464/175 |
| 5,051,105 | 9/1991 | Sugiura | 464/175 |
| 5,145,191 | 9/1992 | Stewart et al. | 464/175 X |
| 5,176,390 | 1/1993 | Lallement | 464/175 X |
| 5,183,351 | 2/1993 | Schneider | 277/212 FB |

FOREIGN PATENT DOCUMENTS

| | | | |
|---|---|---|---|
| 2257042 | 8/1975 | France | 464/175 |
| 4160229 | 6/1992 | Japan | 464/175 |

Primary Examiner—Daniel P. Stodola
Assistant Examiner—Eileen Dunn
Attorney, Agent, or Firm—Saul Schwartz

[57] ABSTRACT

A stroking constant velocity universal joint has a seal boot produced from a thermoplastic elastomer. The seal boot has a large diameter skirt at one end that attaches the seal boot to the universal joint housing and a small diameter ring at an opposite end that attaches the seal boot to a drive shaft associated with the universal joint. The seal boot has a generally cylindrical bellows section that comprises a plurality of serially arranged convolutes integrally connected to the skirt by a conical wall. The bellows section has a maximum diameter that is substantially less than the diameter of the skirt. An intermediate biconic section is integrally attached to the bellows section. It has a maximum diameter that is substantially less than the diameter of the skirt and a root-to-root length that is substantially greater than the root-to-root length of any individual convolute of the bellows section. A single convolute interconnects the biconic section and the small diameter ring. It also has a maximum diameter that is substantially less than the diameter of the skirt and a length that is greater than the length of any individual convolute of the bellows section but less than the length of the biconic section.

3 Claims, 6 Drawing Sheets

THERMOPLASTIC ELASTOMER SEAL BOOT

BACKGROUND OF THE INVENTION

This invention relates generally to elastomer type seal boots for universal joints and more particularly to elastomer type seal boots that are made of a thermoplastic elastomer for constant velocity universal joints that stroke.

There are generally two kinds of elastomer type seal boots for universal joints depending upon the elastomer of which the seal boots are made. One kind is the rubber type where the seal boot is made of a natural or synthetic rubber, such as neoprene. The other kind is the plastic type where the seal boot is made of a thermoplastic elastomer, such as HYTREL, a segmented polyester-polyether copolymer type of thermoplastic elastomer that is marketed by E.I. DuPont deNemours and Company of Wilmington, Del.

Plastic seal boots are usually produced by an extrusion or injection blown process. They are generally thinner and lighter than the rubber seal boot but are generally less flexible. Consequently, plastic seal boots are constructed as a conically shaped bellows type structure having a large number of convolutes serially arranged end-to-end between a large diameter mounting skirt and a small diameter mounting ring for attaching the plastic seal boot to the universal joint. The convolutes are generally of equal length and of uniformly decreasing diameter with an enlarged convolute contiguous the large diameter mounting skirt. See for instance U.S. Pat. No. 4,735,596 granted to Mikio Ukai et al Apr. 5, 1988, which discloses a "conventional" plastic seal boot for a stroking constant velocity universal joint in FIGS. 1 and 2 that is shaped like a conical bellows comprising has a plurality of equal length convolutes of uniformly decreasing diameter interposed between large and small diameter mounting rings.

Attempts have been made to improve the stress distribution in the "conventional" plastic seal boot and thereby increase its durability and life. See for instance the Ukai patent discussed above and U.S. Pat. No. 4,844,486 granted to Wolfram Schiemann Jul. 4, 1989 for an oil and grease-proof bellows for enclosing joints on axles of motor vehicles. These past attempts propose to increase durability and life by modifying one or more convolutes, particularly the convolute adjacent the small diameter mounting ring while retaining the large regular conical shape of the plastic seal boot.

SUMMARY OF THE INVENTION

The object of this invention is to provide an improved plastic seal boot for stroking constant velocity universal joints that provides increased durability and life but in a configuration that is considerably smaller and more compact than the large regular conical shape of existing plastic seal boots.

One feature of the invention is that the improved plastic seal boot has better stress distribution and consequently improved flex fatigue life in comparison to conventional plastic seal boots.

Another feature of the invention is that the improved plastic seal boot has a decreased internal volume and consequently requires substantially less grease than conventional and other known prior art plastic seal boots.

Still another feature of the invention is that the improved plastic seal boot has a smaller package size and hence a greater speed stability in comparison to conventional and other known prior art plastic seal boots.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
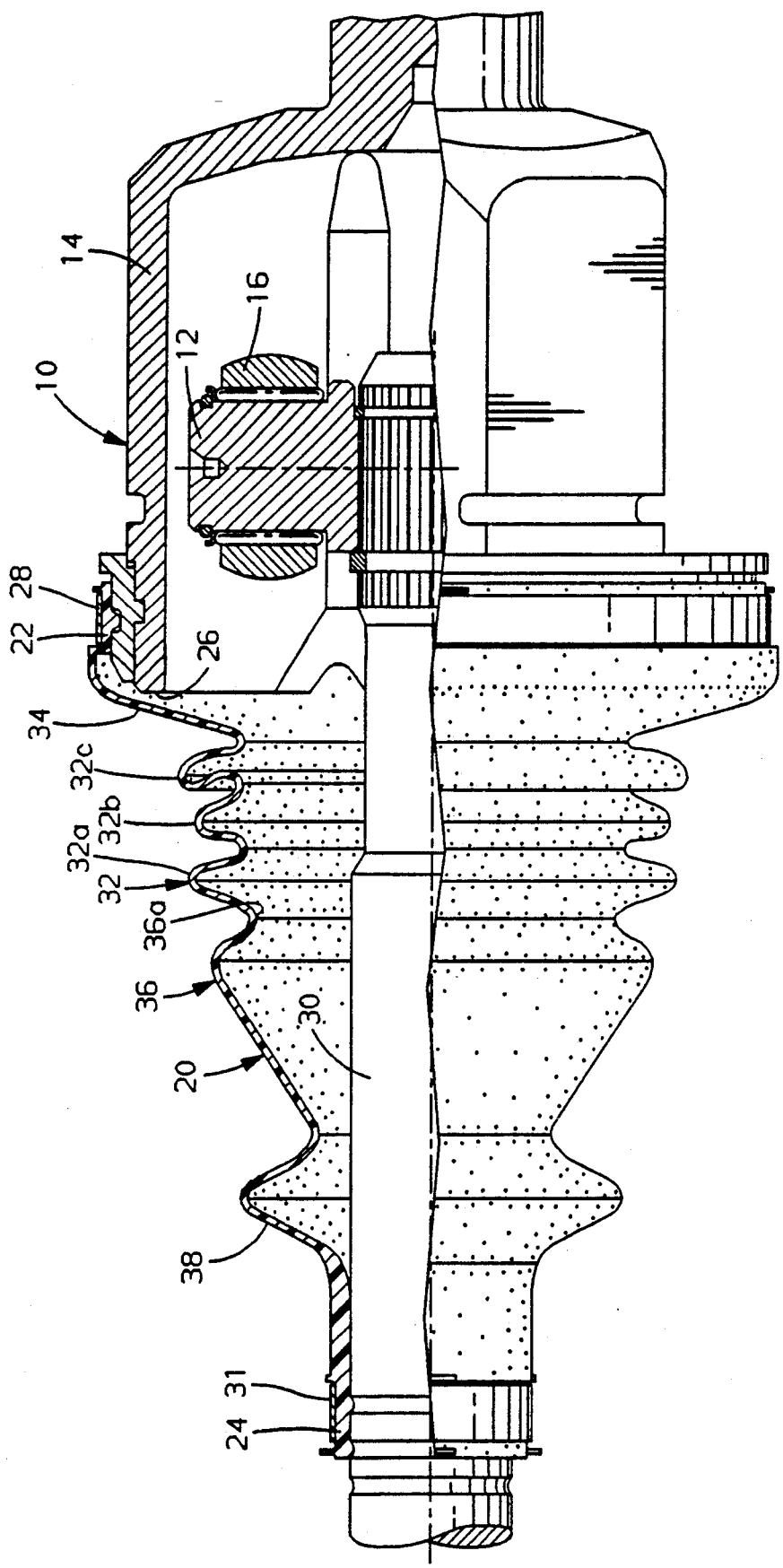
FIG. 1 is a longitudinal partially sectioned view of a stroking constant velocity universal joint having a plastic seal boot in accordance with this invention. The universal joint is shown at zero stroke and zero angle, that is, with the inner and outer drive member disposed in a medial longitudinal position relative to each other and having their respective longitudinal axes aligned concentrically.

Referring now to the drawing a stroking constant velocity universal joint 10 conventionally comprises an inner drive member 12, an outer drive member 14 and a plurality of drive elements such as balls or rollers 16 that transfer torque between the drive members while allowing the drive members 12 and 14 to angulate with respect to each other. The drive elements are also associated with the drive members 12 and 14 in such a way that the drive members 12 and 14 can translate in the longitudinal direction with respect to each other allowing the universal joint to stroke.

The universal joint 10 further comprises a low profile, long life plastic seal boot 20 for sealing the universal joint member 10. The seal boot 20 is made of a thermoplastic elastomer such as HYTREL which is a segmented polyester-polyether copolymer type of thermoplastic elastomer that is marketed by E.I. DuPont deNemours and Company of Wilmington, Del. Another suitable material is SANTOPREME which is a thermoplastic elastomer alloy of polypropylene and highly cross-linked EPDM rubber (Ethylene-Propylene-Diene Rubber) marketed by Elastomer Systems of Marysville, Mo.

The seal boot 20 has a large diameter skirt 22 at one end and a small diameter ring 24 at an opposite end. The skirt 22 is mounted on a circular fitting at an open end 26 of the outer drive member 14 that houses the inner drive member 12 and drive rollers 16 and clamped by a conventional metal clamp ring 28 that attaches the plastic seal boot 20 to the outer joint member 14 securely.

The small diameter ring 24 at the opposite end of the plastic seal boot 20 is mounted on a drive shaft 30 that is drive connected to the inner drive member 12 at one end and clamped by a conventional metal clamp ring 31 that attaches the plastic seal boot 20 to the drive shaft 30 securely.

The plastic seal boot 20 has a generally cylindrical bellows-like end section 32 that comprises a plurality of serially arranged, convolutes 32a, 32b and 32c that are similar in size and of substantially uniform thickness. The convolutes 32a 32b and 32c are and relatively shallow in comparison to conventional convolutes, for examples less than 20 mm in comparison to and the convolutes have crests and roots that are round or radiused in comparison to the sharp peaks and valleys of conventional convolutes. Thus an axial section of the bellows like end section 32 is sinuous or serpentine in nature unlike the deep, V-shaped accordion like appearance of conventional bellows shaped seal boots.

The serpentine end section 32 is integrally connected to the large diameter skirt 22 by a conic wall 34 that extends from one root of the adjacent convolute 32c and it has a maximum diameter, as determined by the largest crest of the serially arranged convolutes 32a, 32b and 32c, that is substantially less than the diameter of the skirt 22. By way of example, a workable embodiment of our invention for a universal joint with a stroke of 46 mm and maximum angles of 13° and 25° at maximum compression and maximum extension respectively, has a serpentine end section having a maximum diameter of 80 mm at convolute 32c for a plastic seal boot that has an overall length of 115 mm (between the skirt 22 and the ring 24) and a diameter of 102 mm for the mounting skirt 22. The maximum angles for any given universal joint are determined by the shaft 30 or other part engaging the outer drive member 14 so that as a practical matter the universal joint does not operate at these maximum angles.

The plastic seal boot 28 further includes an intermediate biconic section 36 that has a larger root diameter 36a that is contiguous one root of the adjacent convolute 32a forming part of the bellows-like end section 32. The biconic section 36 also has a maximum diameter that is substantially less than the diameter of the skirt 22. For instance, the workable embodiment of our invention mentioned above has a biconic section that has a maximum diameter of 73 mm 5 mm and a diameter of 102 mm. at the large end.

Moreover, the biconic section 36 has a length measured from root to root that is substantially greater than the root-to-root length of any of the individual convolutes 32a, 32b and 32c of the bellows like section 32. In fact, the length of the biconic section 36 is slightly larger than the total length of the entire bellows-like section 32.

By way of example and referring back to the workable embodiment of our invention mentioned above it has a biconic section having a maximum diameter of 73 mm and a length of 41 mm in comparison to a total length of 38 mm for the bellows section and individual lengths of 16 mm, 10 mm and 12 mm for the convolutes 32a, 32b and 32c respectively.

The plastic seal boot 20 further comprises a single convolute 38 interconnecting the biconic section 36 and the mounting ring 24 at the small diameter end of the boot. The single convolute 38 has a maximum diameter that is substantially less than the diameter of the skirt 22 and in fact less than the diameter of any individual convolute 32a, 32b or 32c or the biconic section 36. Moreover the single convolute 38 has a root-to-root length that is greater than the length of any individual convolutes 32a, 32b and 32c of the bellows-like section 32 but less than the length of the biconic section 36. For instance, the workable embodiment of our invention mentioned above has a single convolute 38 at the small diameter end having a maximum diameter of 60 mm and a length of 24 mm.

Figure 2:
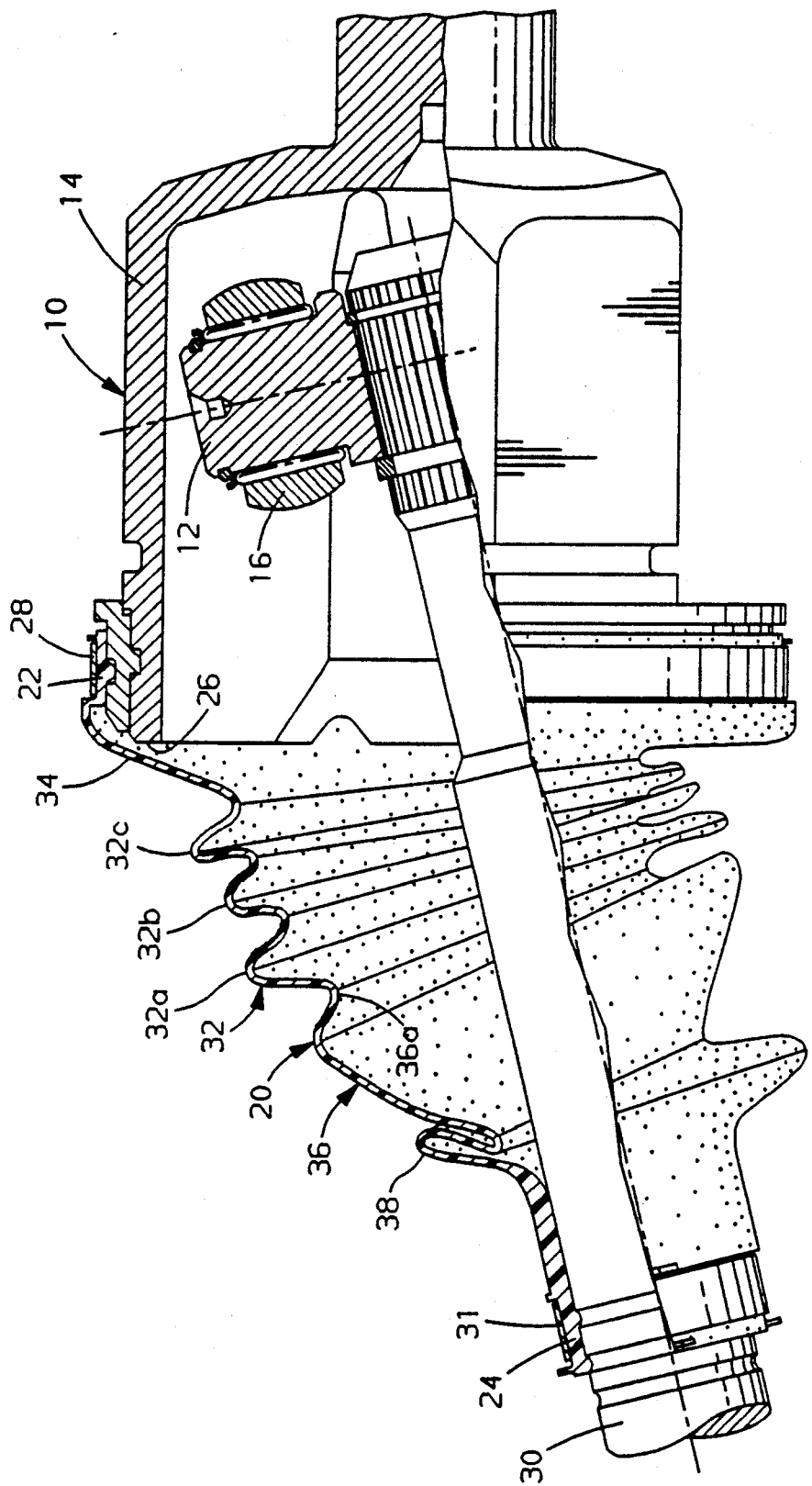
FIG. 2 is a view similar to FIG. 1 but showing the universal joint at maximum compression and angle.
Figure 3:
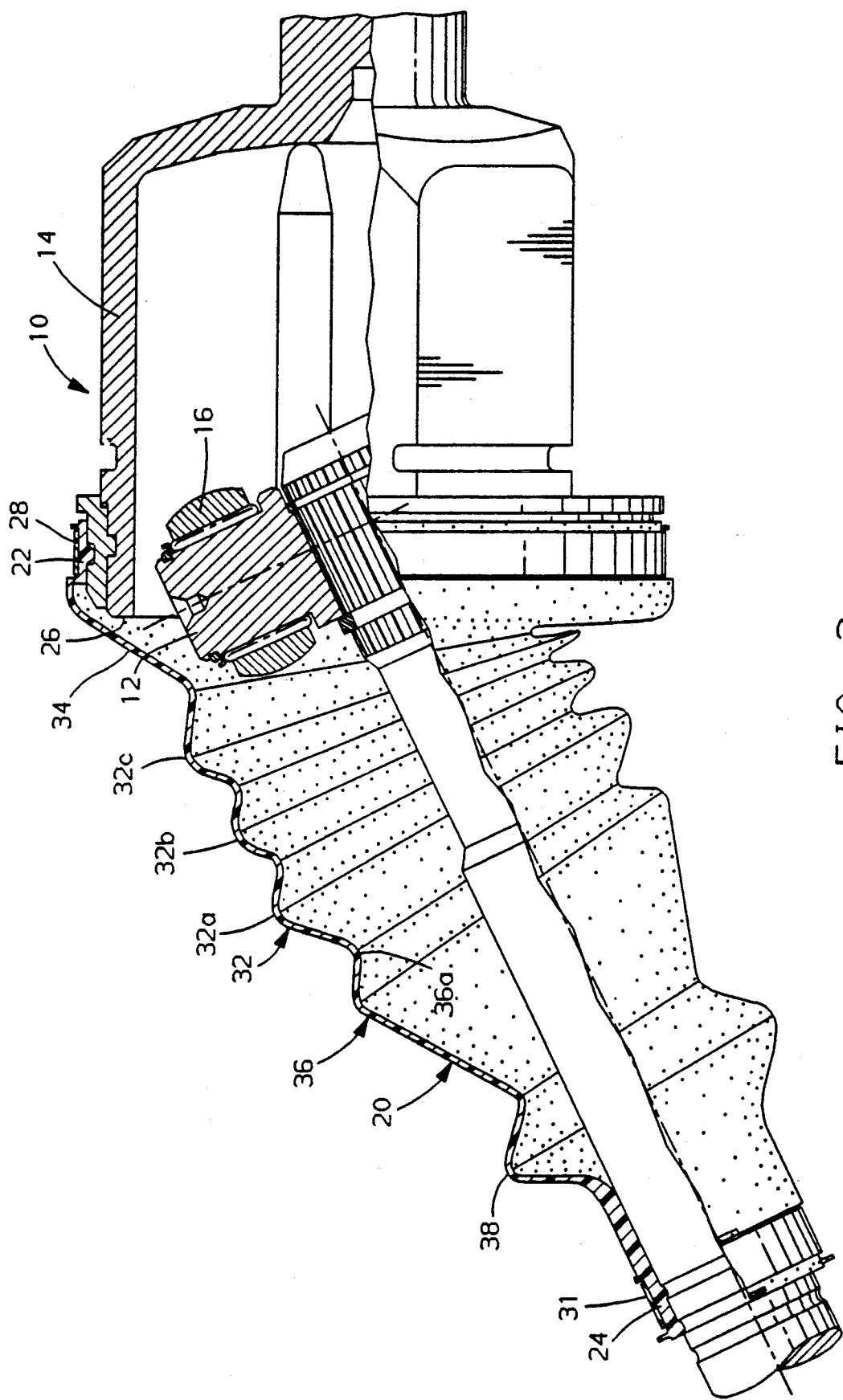
FIG. 3 is also a view similar to FIG. 1 showing the universal joint at maximum extension and angle.

The plastic seal boot 20 when it is configured as described above has an internal volume that is near minimum or at least substantially reduced for a stroking type constant velocity universal joint that has a particular maximum stroke and maximum angle at each end of the stroke, which is the specific example discussed above is a stroke of 46 mm and maximum angles of 13° and 25° at maximum compression and maximum extension respectively. Moreover, the plastic seal boot 20 when configured as described above also had the following desirable characteristics. The plastic seal boot 20 does not contact itself or the drive shaft 16 to any significant degree that would cause noticeable wear at the extreme conditions, that is at maximum compression and angle as shown in FIG. 2 and at maximum extension and angle as shown in FIG. 3.

Figure 4:
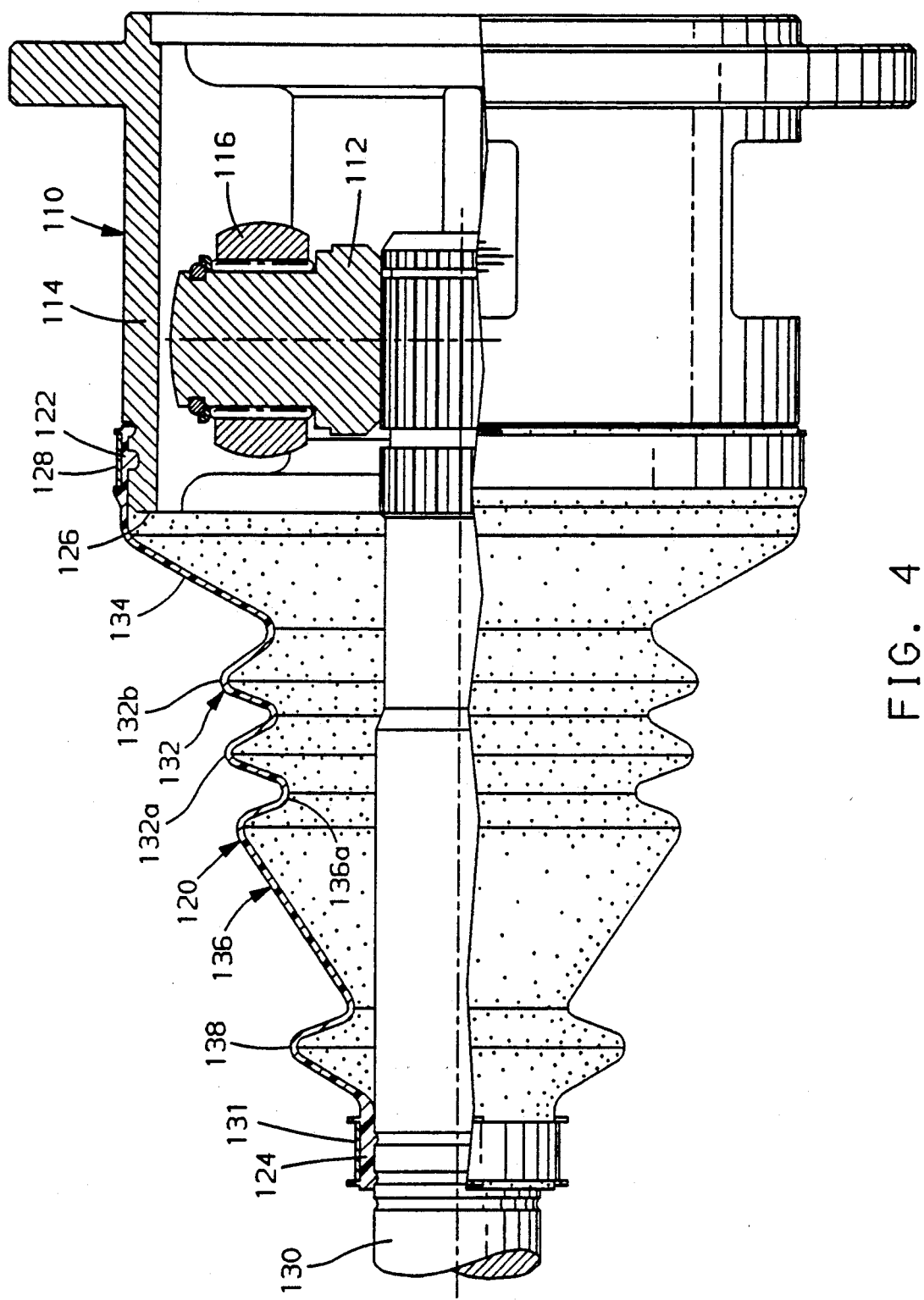
FIG. 4 is a longitudinal partially sectioned view of a stroking constant velocity universal joint having a plastic seal boot in accordance with another embodiment of this invention. The universal joint is shown at zero stroke and zero angle, that is, with the inner and outer drive member disposed in a medial longitudinal position relative to each other and having their respective longitudinal axes aligned concentrically.
Figure 5:
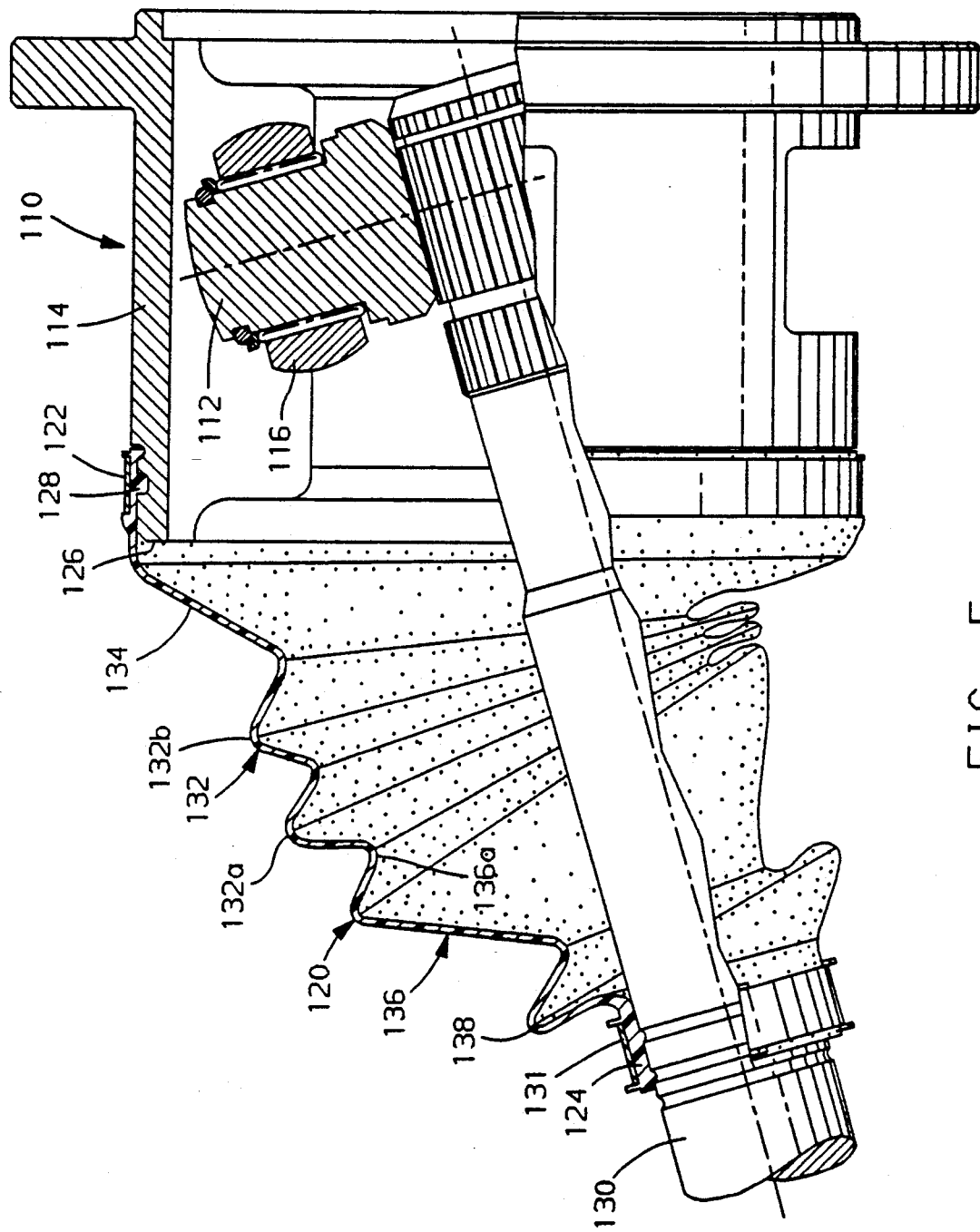
FIG. 5 is a view similar to FIG. 4 but showing the universal joint at maximum compression and angle.
Figure 6:
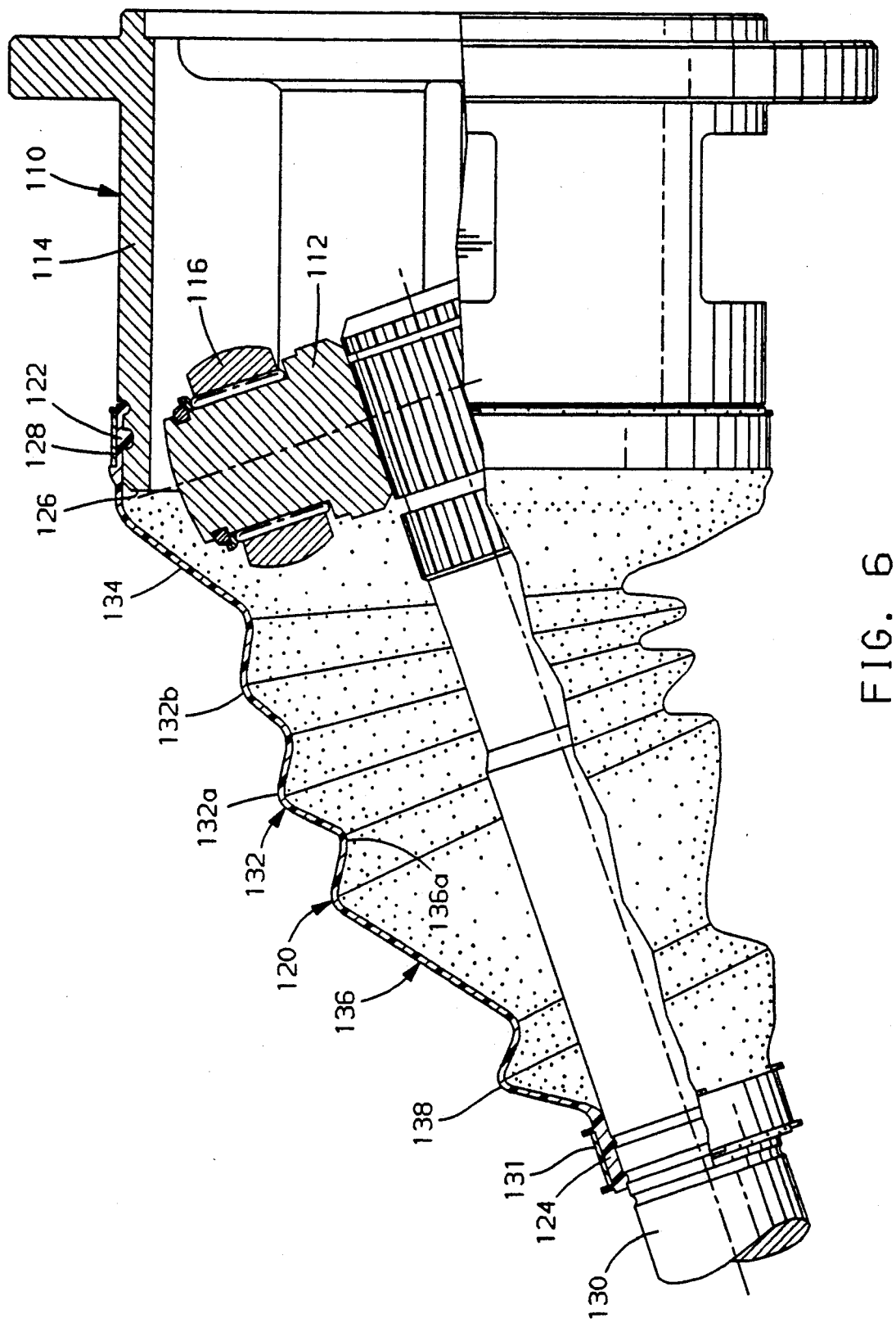
FIG. 6 is also a view similar to FIG. 4 showing the universal joint at maximum extension and angle.

Referring now to FIGS. 4, 5 and 6 another embodiment of the invention is shown in conjunction with a stroking constant velocity universal joint 110 comprising an inner drive member 112, an outer drive member 114 and a plurality of drive elements such as balls or rollers 116 that transfer torque between the drive members while allowing the drive members 112 and 114 to angulate with respect to each other. The drive elements are also associated with the drive members 112 and 114 in such a way that the drive members 112 and 114 can translate in the longitudinal direction with respect to each other allowing the universal joint to stroke.

The universal joint 110 further comprises a low profile, long life plastic seal boot 120 for sealing the universal joint member 110. The seal boot 120 is made of a thermoplastic elastomer such as HYTREL which is a segmented polyester-polyether copolymer type of thermoplastic elastomer that is marketed by E.I. DuPont deNemours and Company of Wilmington, Del. Another suitable material is SANTOPREME which is a thermoplastic elastomer alloy marketed by Elastomer Systems of Marysville, Mo.

The seal boot 120 has a large diameter skirt 122 at one end and a small diameter ring 124 at an opposite end. The skirt 122 is mounted on an open end 126 of the outer drive member 114 that houses the inner drive member 112 and drive rollers 116 and clamped by a metal clamp ring 128 that attaches the plastic seal boot 120 to the outer joint member 114 securely.

The small diameter ring 124 at the opposite end of the plastic seal boot 120 is mounted on a drive shaft 130 that is drive connected to the inner drive member 112 at one end and clamped by a metal clamp ring 131 that attaches the plastic seal boot 120 to the drive shaft 130 securely.

The plastic seal boot 120 has a generally cylindrical bellows-like end section 132 that comprises a plurality of serially arranged, convolutes 132a and 132b that are similar in size and of substantially uniform thickness. The convolutes 132a and 132b are and relatively shallow in comparison to conventional convolutes in comparison to and the convolutes have crests and roots that are round or radiused in comparison to the sharp peaks and valleys of conventional convolutes. Thus an axial section of the bellows like end section 132 is sinuous or serpentine in nature unlike the deep, V-shaped accordion like appearance of conventional bellows shaped seal boots.

The serpentine end section 132 is integrally connected to the large diameter skirt 122 by a radial wall 134 that extends from one root of the adjacent convolute 132b and it has a maximum diameter, as determined by the largest crest of the serially arranged convolutes 132a and 132b, that is substantially less than the diameter of the skirt 122. By way of example, another workable embodiment of our invention for a larger universal joint having a shorter stroke of 41 mm and maximum angles of 15° and 18° at maximum compression and maximum extension respectively, has a serpentine end section having a maximum diameter of 88 mm at convolute 32b for a plastic seal boot that has an overall length of 120 mm (between the skirt 122 and the ring 124) and a diameter of 116 mm for the mounting skirt 122.

The plastic seal boot 128 further includes an intermediate biconic section 136 that has a larger root diameter 136a that is contiguous one root of the adjacent convolute 132a forming part of the bellows-like end section 132. The biconic section 136 also has a maximum diameter that is substantially less than the diameter of the skirt 122. For instance, this second workable embodiment of our invention has a biconic section having a maximum diameter of 83 mm for the plastic seal boot having a length of 120 mm and a diameter of 116 mm. at the large end.

Moreover, the biconic section 136 has a length measured from root to root that is substantially greater than the root-to-root length of any of the individual convolutes 132a and 132b of the bellows like section 132. In fact, the length of the biconic section 136 is larger than the total length of the entire bellows-like section 132.

By way of example and referring back to the second workable embodiment of our invention, it has a biconic section having a maximum diameter of 83 mm and a length of 40 in comparison to a total length of 30 mm for the bellows section and individual lengths of 14 mm and 16 mm for the convolutes 132a and 132b respectively.

The plastic seal boot 120 further comprises a single convolute 138 interconnecting the biconic section 136 and the mounting ring 124 at the small diameter end of the boot. The single convolute 138 has a maximum diameter that is substantially less than the diameter of the skirt 122 and in fact less than the diameter of any individual convolute 132a or 132b of the biconic section 36. Moreover the single convolute 138 has a root-to-root length that is greater than the length of any individual convolutes 132a and 132b of the bellows-like section 132 but less than the length of the biconic section 136. For instance, the second workable embodiment of our invention mentioned above has a single convolute 138 at the small diameter end having a maximum diameter of 60 mm and a length of 17 mm.

The plastic seal boot 120 when it is configured as described above has an internal volume that is near minimum or at least substantially reduced for a stroking type constant velocity universal joint that has a particular maximum stroke and maximum angle at each end of the stroke, which in the specific example for the second embodiment of the invention is a stroke of 41 mm and maximum angles of 15° and 18° at maximum compression and maximum extension respectively. Moreover, the plastic seal boot 120 when configured as described above also had the following desirable characteristics. The plastic seal boot 120 does not contact itself or the drive shaft 130 to any significant degree that would cause noticeable wear at the extreme conditions, that is at maximum compression and angle as shown in FIG. 5 and at maximum extension and angle as shown in FIG. 6.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A low profile, long life plastic seal boot for a stroking constant velocity universal joint comprising:

the seal boot being produced from a thermoplastic elastomer and having a large diameter skirt at one end for attaching the seal boot to a round open end of a universal joint housing and a small diameter ring at an opposite end for attaching the seal boot to a drive shaft associated with the universal joint housing.

the seat boot having a generally cylindrical serpentine end section that comprises a plurality of convolutes serially arranged end-to-end and that is integrally connected to the skirt by a radial wall, the serpentine end section having a maximum diameter at a crest of one of the convolutes thereof that is substantially less than the diameter of the skirt, the seal boot having an intermediate biconic section that has a large diameter end root that is integrally attached to a root of an adjacent convolute of the serpentine end section, the biconic section having a maximum diameter that is substantially less than the diameter of the skirt and less than the maximum diameter of the serpentine end section.

the biconic section having a root-to-root length that is substantially greater than the root-to-root length of any individual convolute of the serpentine end section and greater than the combined length of the convolutes of the serpentine end section, the seal boot having a single convolute interconnecting the biconic section and the ring, the single convolute having a maximum diameter that is substantially less than the diameter of the skirt and a length that is greater than the length of any individual convolute of the serpentine end section but less than the root-to-root length of the biconic section.

2. The boot seal as defined in claim 1 wherein the serpentine end section consists of two convolutes.

3. The boot seal as defined in claim 1 wherein the serpentine end section consists of three convolutes.

* * * * *